(12) United States Patent
Zhang et al.

(10) Patent No.: US 9,307,858 B2
(45) Date of Patent: Apr. 12, 2016

(54) AUTOMATIC CARTRIDGE EJECTING UNIT FOR A COFFEE MACHINE

(71) Applicant: TSANN KUEN (ZHANG ZHOU) ENTERPRISE CO., LTD., Zhang Zhou, Fujian (CN)

(72) Inventors: Yanxiang Zhang, Zhang Zhou (CN); Weijun Zhong, Zhang Zhou (CN)

(73) Assignee: TSANN KUEN (ZHANG ZHOU) ENTERPRISE CO., LTD., Zhangzhou (CN)

( * ) Notice: Subject to any disclaimer, the term of this patent is extended or adjusted under 35 U.S.C. 154(b) by 236 days.

(21) Appl. No.: 13/950,091

(22) Filed: Jul. 24, 2013

(65) Prior Publication Data
US 2014/0026760 A1 Jan. 30, 2014

(30) Foreign Application Priority Data
Jul. 24, 2012 (CN) ...................... 2012 2 0361078 U

(51) Int. Cl.
*A47J 31/36* (2006.01)
*A47J 31/40* (2006.01)

(52) U.S. Cl.
CPC ............ *A47J 31/407* (2013.01); *A47J 31/3633* (2013.01); *A47J 31/3638* (2013.01); *A47J 31/3676* (2013.01)

(58) Field of Classification Search
CPC .............. A47J 31/3633; A47J 31/3638; A47J 31/3666; A47J 31/3676; A47J 31/3695
USPC ................................ 99/289 R, 295
See application file for complete search history.

(56) References Cited

U.S. PATENT DOCUMENTS

| | | | |
|---|---|---|---|
| 6,955,116 B2 * | 10/2005 | Hale | 99/295 |
| 7,320,274 B2 * | 1/2008 | Castellani | 99/295 |
| 7,980,169 B2 * | 7/2011 | Fischer | 99/289 R |
| 8,733,231 B2 * | 5/2014 | Turi | 99/295 |
| 8,973,486 B2 * | 3/2015 | Frigeri et al. | 99/289 P |
| 8,978,543 B2 * | 3/2015 | Baldo et al. | 99/289 R |

* cited by examiner

*Primary Examiner* — Reginald L Alexander
(74) *Attorney, Agent, or Firm* — Rabin & Berdo, P.C.

(57) ABSTRACT

An automatic cartridge ejecting unit for a coffee machine has a housing, a top cover, a bottom cover, a cartridge ejecting member and a return unit. The top cover is rotationally assembled on the housing. The bottom cover, which is slidably assembled on the housing and in transmission connection with the top cover, is disposed with an infusion chamber and a cavity. The cartridge ejecting unit is rotationally assembled on the bottom cover and rotates between the initial position and the open position with the action of the top cover. When the cartridge ejecting unit is in the open position, the coffee cartridge is unloaded and falls into the cavity.

10 Claims, 8 Drawing Sheets

AUTOMATIC CARTRIDGE EJECTING UNIT FOR A COFFEE MACHINE

FIELD OF THE INVENTION

The present invention relates to an automatic cartridge ejecting unit for a coffee machine.

BACKGROUND OF THE INVENTION

With people's continually pursuing for different tastes of coffee, and emphasizing the convenience of the coffee's carrying, storing, extracting, etc, different tastes of coffee are packed up in cartridges after baking and grinding, to keep the coffee fresh and delicious. People use this kind of coffee cartridge without grinding. Only need to load them in the coffee machine and fast extract the delicious coffee with heating hot water passing by the coffee cartridge by water pump. Finally, take out the coffee cartridge.

In the previous machine operation, the coffee cartridge is usually taken out by hand. The coffee cartridge is so hot that hurt the hand, and it is not convenient.

For this situation, a known appliance is invented which can make the coffee cartridge drop into the trash can automatically. There is no need to take out the coffee cartridge to throw away every time for this kind of appliance. It can realize continuously unloading the cartridge automatically and throw up the coffee cartridge when the trash can is full. Therefore, avoid hurting hands. But thus appliance is so complicated that the cost is too high, and the extracting operation is too complicated, and it takes more room.

SUMMARY OF THE INVENTION

The object of the present invention is to offer an automatic cartridge ejecting unit for a coffee machine which overcomes the drawback.

The technical proposal solving the technical matter in the present invention is:

An automatic cartridge ejecting unit for a coffee machine, comprises a housing (100); a top cover (200) rotationally assembled on the housing (100); a bottom cover disposed with an infusion chamber (110) used to load the coffee cartridge and extract the coffee and a cavity used to contain the waste coffee cartridge, which is slidably assembled on the housing (100) and in transmission connection with the top cover (200), said top cover (200) is arranged over the bottom cover (400);

A cartridge ejecting member (300) is used to hold the coffee cartridge, which is rotationally assembled on the bottom cover (400) and lies between the top cover (200) and bottom cover (400); the cartridge ejecting member (300) rotates between initial position and open position with the action of the top cover (200). The coffee cartridge is unloaded and falls into the cavity (120) automatically when the cartridge ejecting member (300) is in the open position;

A return unit is used to reset the bottom cover (400), which is assembled between the bottom cover (400) and the housing (100).

In a preferred embodiment, further comprising two pushrods (500), which are respectively pivoted to the two sides of the top cover (200) in one end and to the two sides of the bottom cover (400) in the other end.

In a preferred embodiment, the return unit includes two first elastic components (600), two grooves (140) throughout the housing are respectively arranged in two sides of the housing (100); two bumps (420) are respectively arranged in two outsides of the bottom cover (400); one end of every first elastic component (600) is respectively fixedly connected to the two outsides of the housing (100), the two bumps (420) respectively stretch into the two grooves (140) and fixedly connect to the other end of the first elastic (600) component.

In a preferred embodiment, plural rails (130) are arranged at the inner bottom of the housing (100), and plural sliders (410) are arranged at the exterior bottom of the bottom cover (400) to match the rails (130).

In a preferred embodiment, the cartridge ejecting member includes a loading seat (310) and two sliding rods (320), one ends of the two sliding rods are respectively rotationally connected to the bottom cover (400) and the ends correspond to the cavity (120), the other ends of two sliding rods (320) are respectively fixedly connected to the loading seat (310), which correspond to and stretch to the infusion chamber (110).

In a preferred embodiment, the cartridge ejecting member (300) arranges two limit components (340) which can make the cartridge ejecting member's (300) open angle smaller than the top cover's (200) largest open angle; two limit holes are arranged on the bottom cover (400) to match the limit components (340).

In a preferred embodiment, two hook mechanisms (210) are arranged on the top cover (200), two flanges (350) are arranged on the cartridge ejecting member (300), the two hook mechanisms (210) can respectively clamp the two flanges (350).

In a preferred embodiment, two cylinders (330) are arranged on the cartridge ejecting member (300), two axle holes are arranged on the bottom cover (400) to match the two cylinders (330); the two limit components (340) are fixedly arranged on the two cylinders (330).

In a preferred embodiment, further comprising a first spindle (220), the top cover (200) rotationally assembled on the housing (100) by the first spindle (220); two second elastic components (230) make the top cover (200) opened by a certain angle; the second elastic component (230) is assembled on the first spindle (220), whose one end is against the top cover (200), the other end is against the housing (100).

In a preferred embodiment, the second elastic component (230) is a torsional spring, a handle (240) is flexibly assembled to the top cover (200), and two clasps (250) are in transmission connection with the handle (240); two location pins (430) are assembled on the bottom cover (400) to match the two clasps (250).

Compared with the technical proposals of prior arts, the benefits of the present invention are:

1 The top cover is opened rotationally, the cartridge ejecting unit is rotated to the open position, the coffee cartridge is unloaded and falls into the cavity to finish the automatic cartridge expulsion. Meanwhile, the top cover actuate the bottom cover to move forward and the housing stretches out to make the infusion chamber shown intuitively to the consumers. Thus, the consumers can be easier to load the coffee cartridge in the correct position without the limitation of open angle, and the bottom cover can be reset to the housing through the return unit.

2 The return unit includes the first elastic component and groove, the bump is arranged on the outsides of the bottom cover, the return unit can make the bottom cover reset to the initial position in the housing, the matching of the bump and groove can limit the bottom cover's back and forth motion distance, and then limit the top cover's largest open angle.

3 The limit component is arranged on the cartridge ejecting member, so that the cartridge ejecting member's open angle is smaller than the top cover's largest open angle, the matching of the hook and the flange makes the cartridge ejecting member return to the bottom cover when it is in the open position, the structure is simple, the cost is low, and the cartridge ejecting member returns well.

4 The matching of the clasp and the location pin joint the top cover and bottom cover, only open the handle, can the top cover be opened, thus, strengthen the structure's safety performance to avoid potential safety hazard.

BRIEF DESCRIPTION OF THE DRAWINGS

With the following description of the drawings and specific embodiments, the invention shall be further described in details.

DESCRIPTION OF THE PREFERRED EMBODIMENTS

Figure 1:
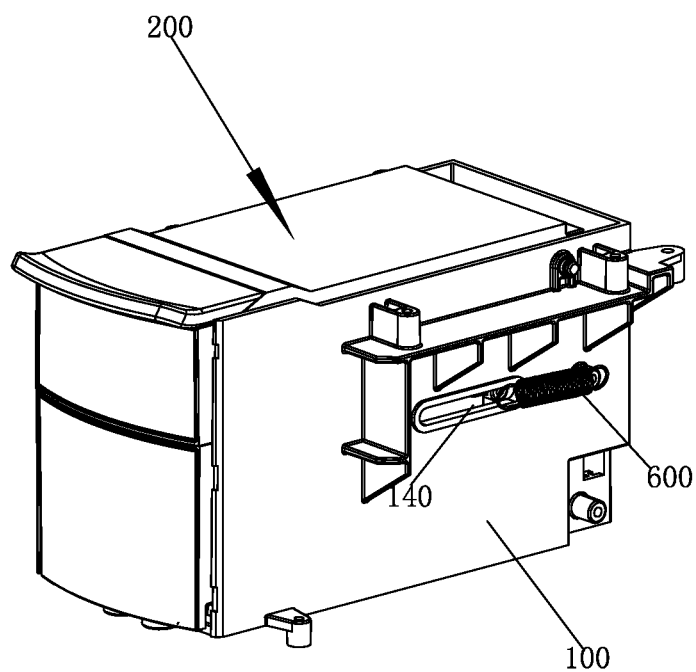
FIG. 1 shows the overall view of an automatic cartridge ejecting unit for a coffee machine in a preferred embodiment.
Figure 2:
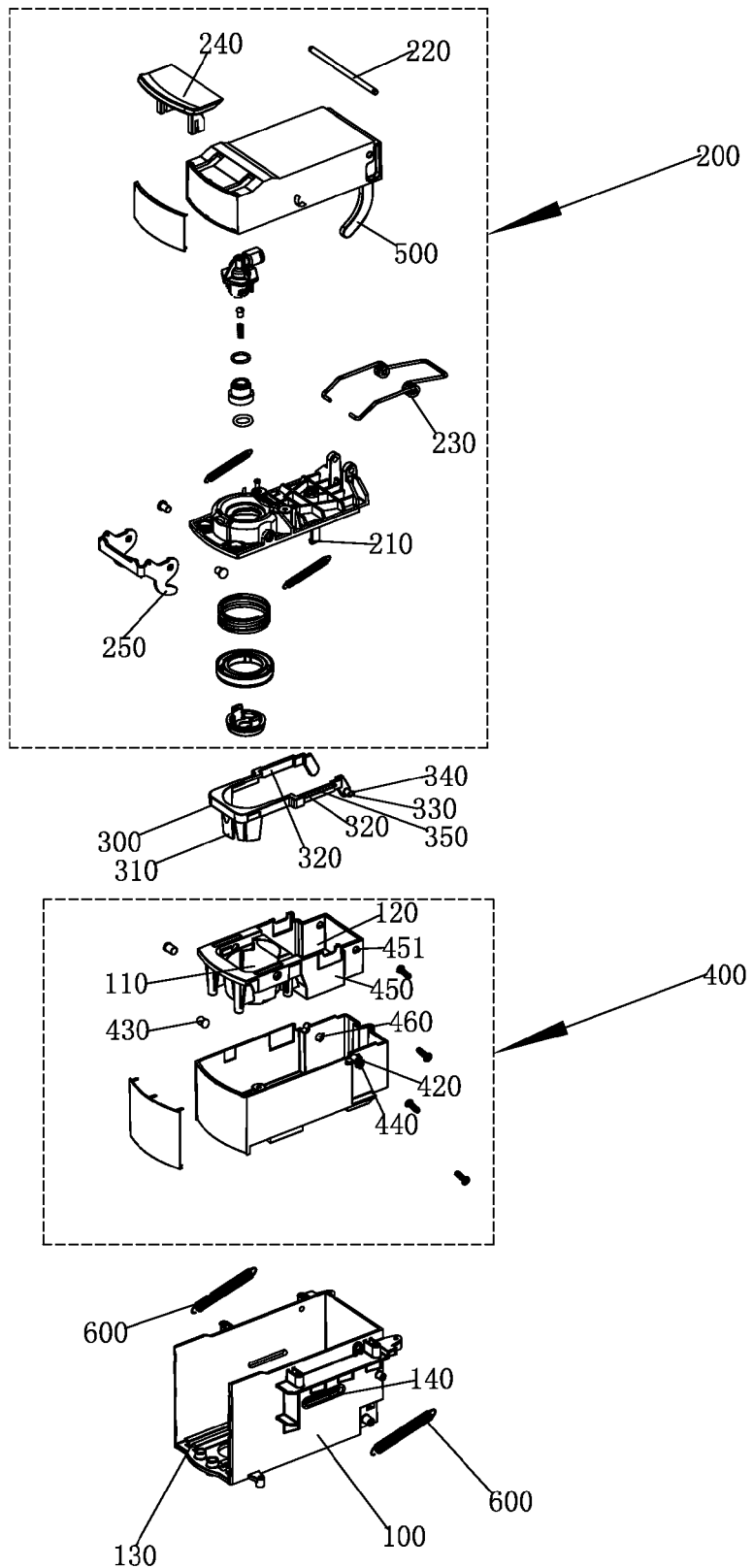
FIG. 2 shows the solid exploded view of an automatic cartridge ejecting unit for a coffee machine in a preferred embodiment.
Figure 3:
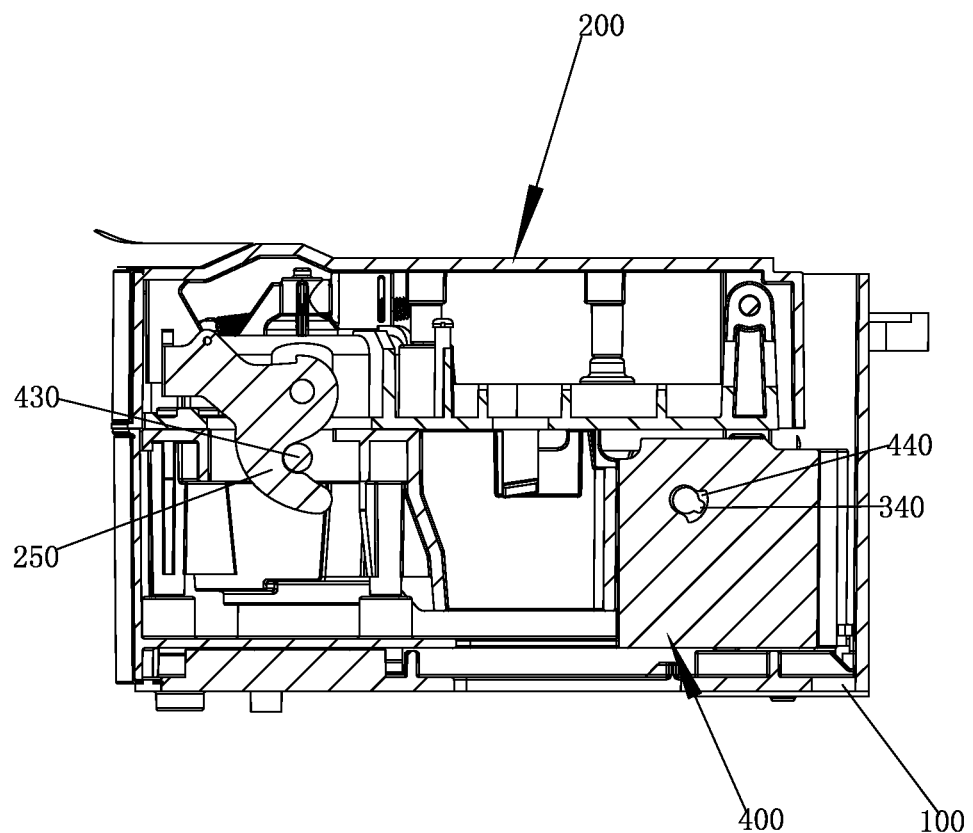
FIG. 3 shows the cutaway view of an automatic cartridge ejecting unit for a coffee machine in a preferred embodiment, the clasp and the location pin is matched at this moment.
Figure 4:
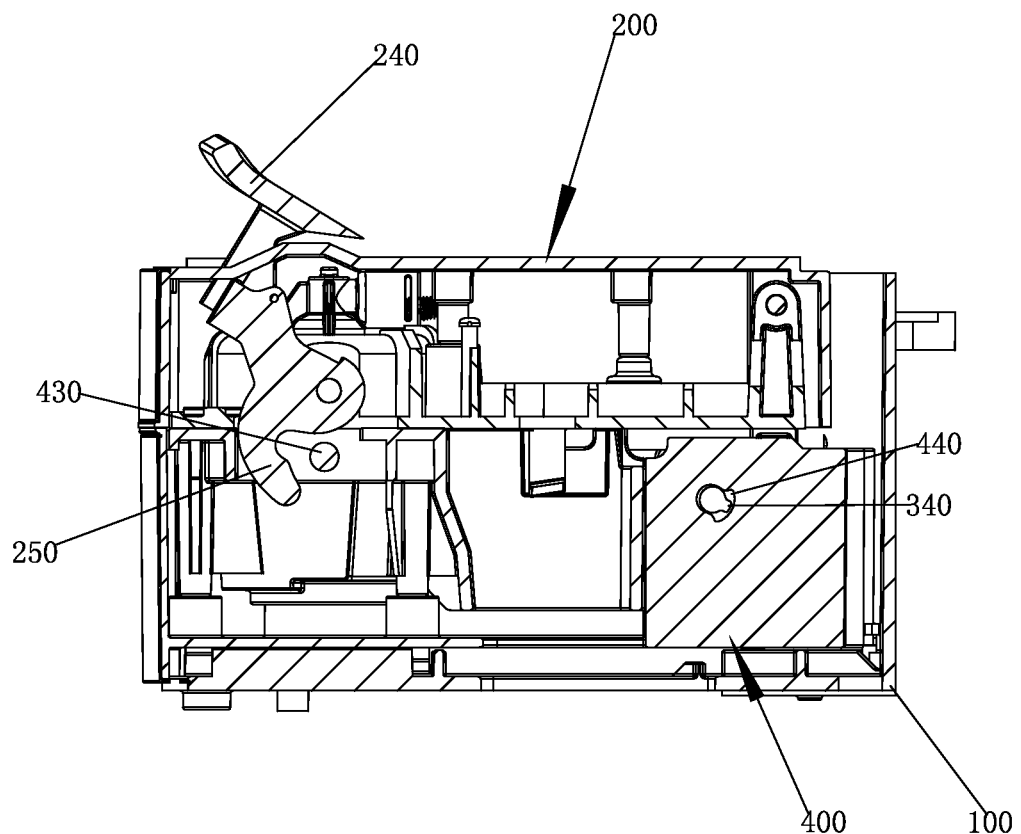
FIG. 4 shows the cutaway view of an automatic cartridge ejecting unit for a coffee machine in a preferred embodiment, the clasp and the location pin is separated at this moment.
Figure 5:
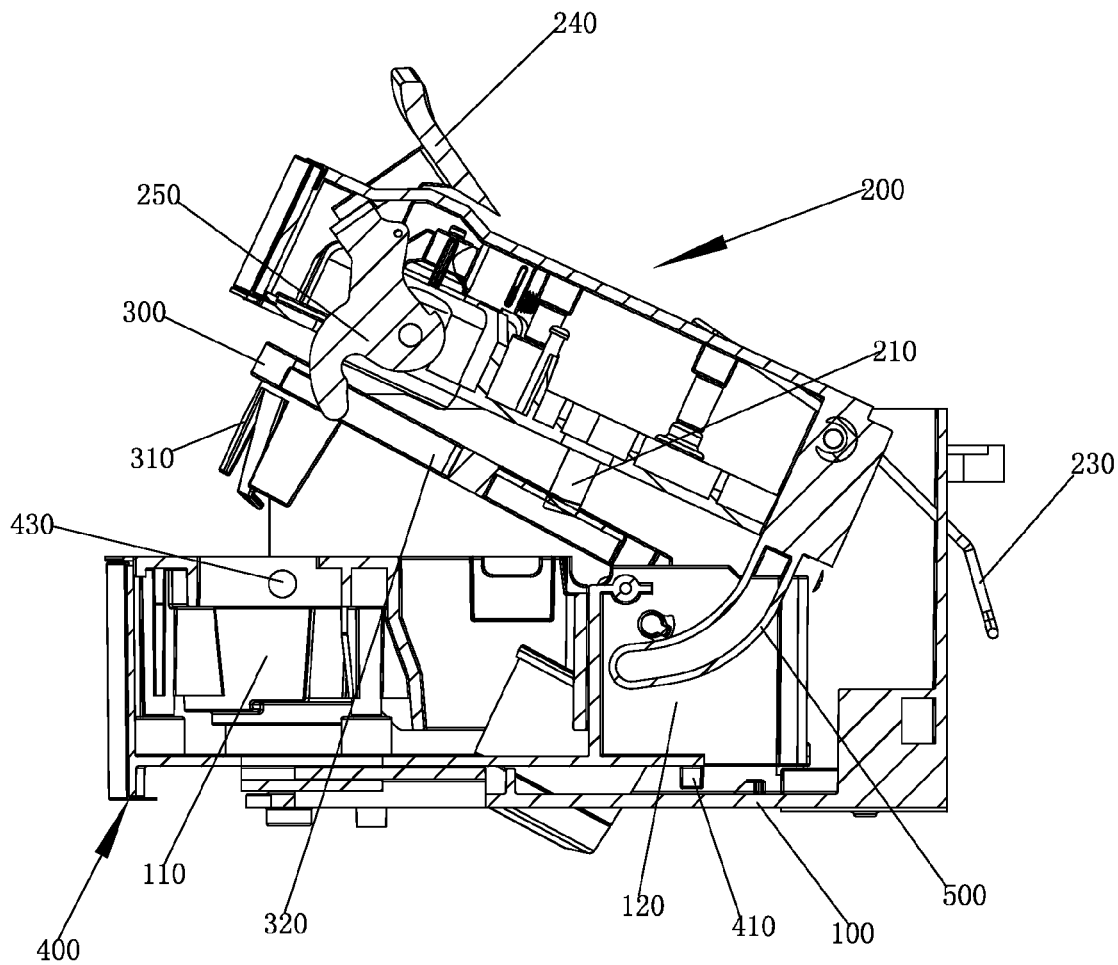
FIG. 5 shows the cutaway view of an automatic cartridge ejecting unit for a coffee machine in a preferred embodiment, the top cover is opened and the cartridge ejecting member is clamped to the top cover at this moment.
Figure 6:
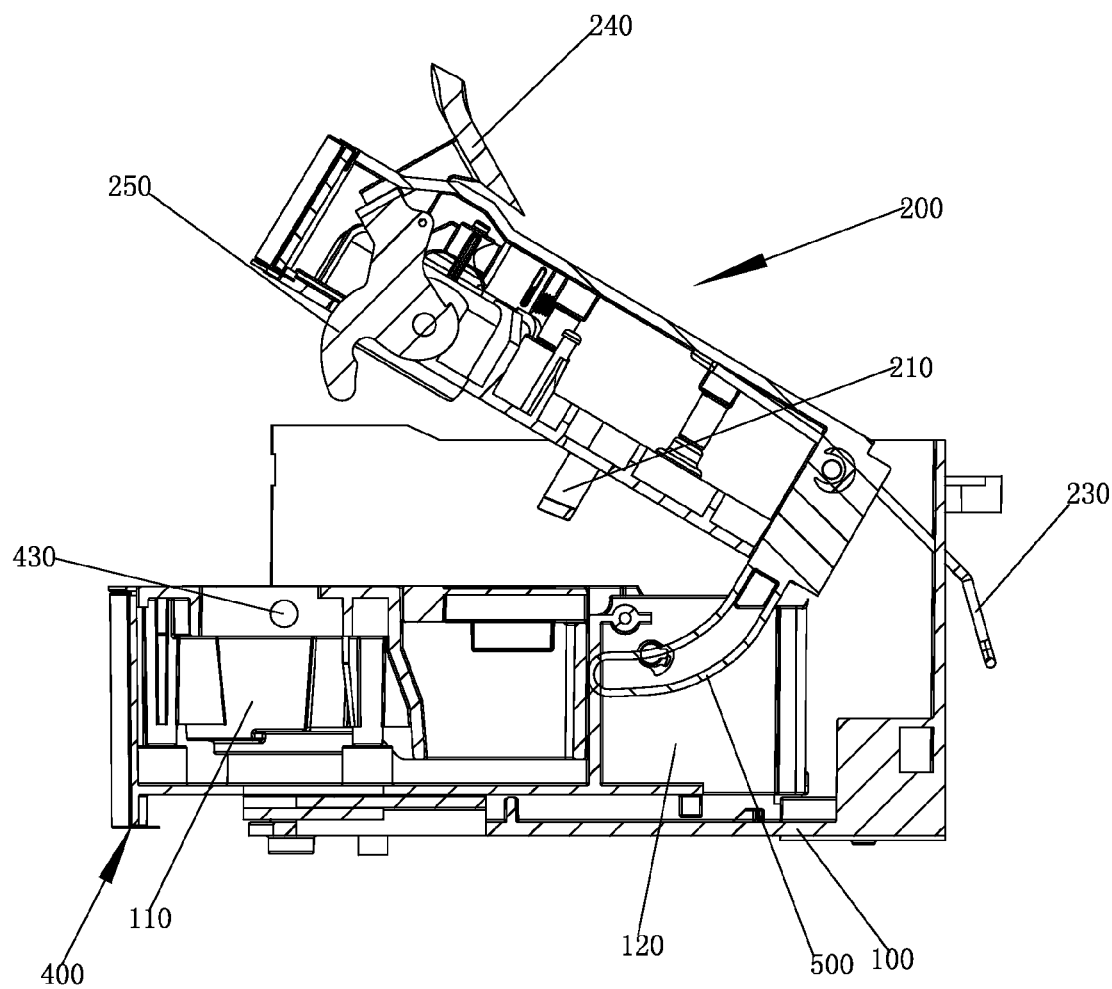
FIG. 6 shows the cutaway view of an automatic cartridge ejecting unit for a coffee machine in a preferred embodiment, the cartridge ejecting member leaves the top cover and falls into the bottom cover at this moment.
Figure 7:
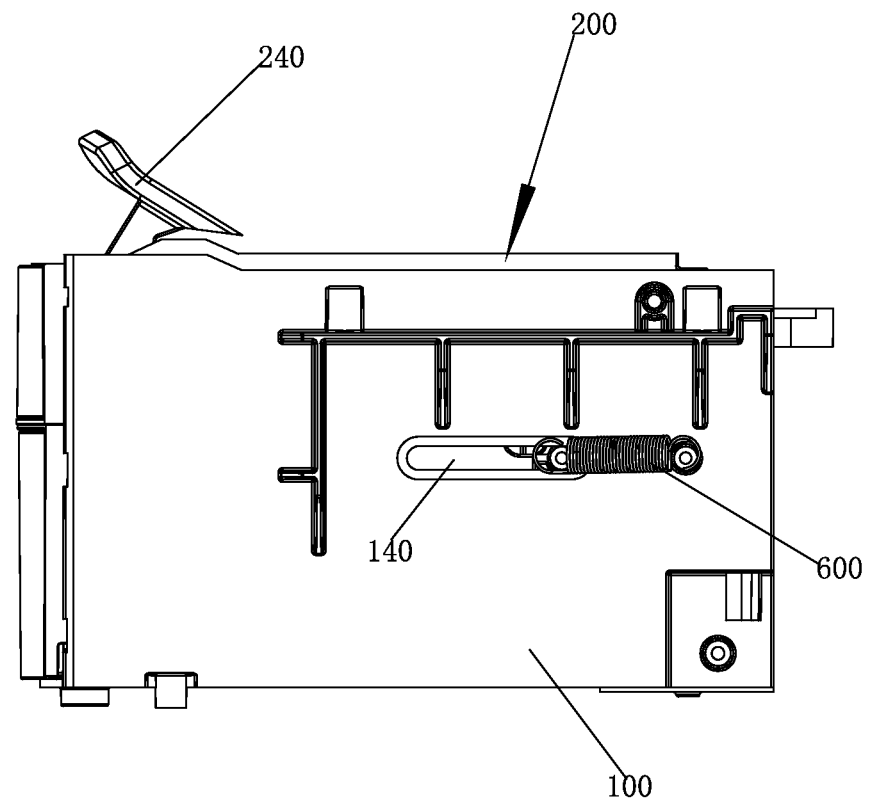
FIG. 7 shows the front view of an automatic cartridge ejecting unit for a coffee machine in a preferred embodiment, the top cover is closed and the handle is unfolded at this moment.
Figure 8:
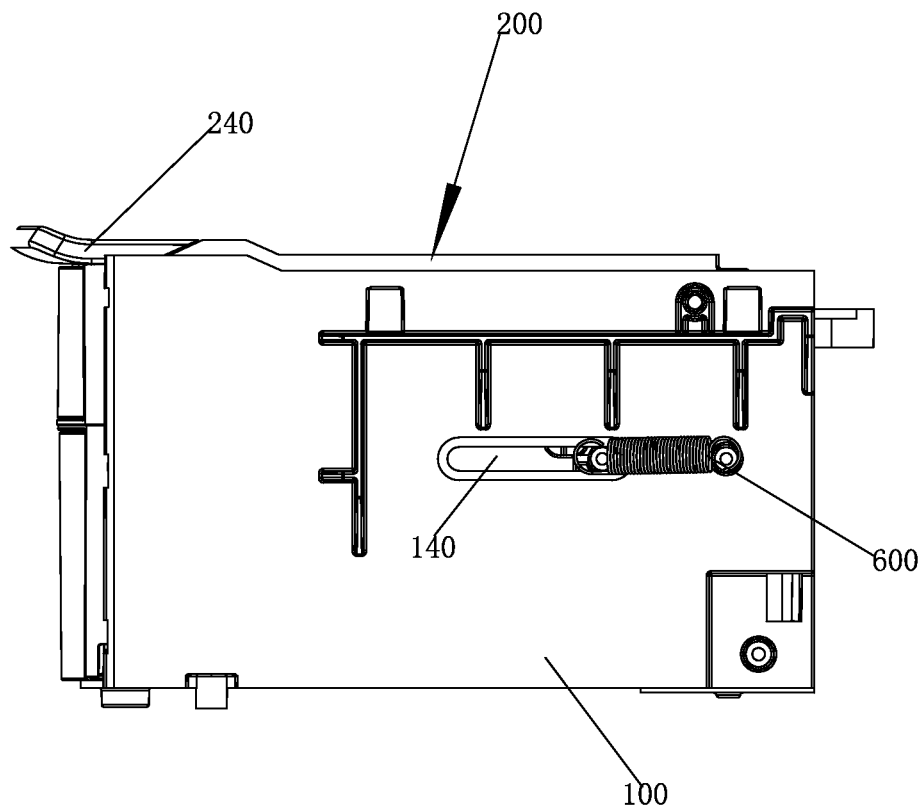
FIG. 8 shows the front view of an automatic cartridge ejecting unit for a coffee machine in a preferred embodiment, the top cover is closed and the handle is folded at this moment.

According to FIG. 1 to FIG. 8, an automatic cartridge ejecting unit for a coffee machine, it comprises a housing (100), a top cover (200), a bottom cover (400), a cartridge ejecting member (300) and a return unit.

The housing (100) with two grooves (140) throughout its body and respectively arranged on two sides of it, has plural rails (130) arranged at the inner bottom of it.

The top cover (200) rotationally assembled on the housing (100). In the present embodiment, two hooks (210) are arranged on the top cover (200). In the present embodiment, the cartridge ejecting unit includes a first spindle (220), the top cover (200) is rotationally assembled on the housing (100) by the first spindle (220); two second elastic components (230) make the top cover (200) opened by a certain angle. The second elastic component (230) is assembled on the first spindle (220), whose one end is against the top cover (200), the other end is against the housing (100). Preferably, the second elastic component (230) should be a torsional spring. The handle (240) is flexibly assembled to the top cover (200), and two clasps (250) are in transmission connection with the handle (240); two location pins (430) are assembled on the bottom cover (400) to match the two clasps (250).

A bottom cover (400) disposed with an infusion chamber (110) used to load the coffee cartridge and extract the coffee, and a cavity (120) used to contain the waste coffee cartridge, which is slidably assembled on the housing (100) and in transmission connection with the top cover (200), the top cover (200) is arranged over the bottom cover (400).

In the present embodiment, two bumps (420) are respectively arranged in two outsides of the bottom cover (400), the sliders (410) are arranged at the exterior bottom of the bottom cover (400) to match the rails (130), two location pins (430) are assembled on the bottom cover (400) to match the two clasps (250) and two axle holes are arranged on the bottom cover (400). In the present embodiment, a casing (450) is fixedly assembled on the bottom cover (400), the infusion chamber (110) and cavity (120) are all arranged on the casing (450), two first axis holes (451) are arranged on the casing (450), two second axis holes (460) are arranged on the bottom cover (400), the first axis holes (451) and the second axis holes (460) are one to one correspondence.

In the present embodiment, the cartridge ejecting unit further comprises two pushrods (500), which are respectively pivoted to the two sides of the top cover (200) in one end and to two sides of the bottom cover (400) in the other end, the two pushrods (500) realize the transmission connection of the top cover (200) and the bottom cover (400).

The cartridge ejecting member (300) can hold the coffee cartridge, which is rotationally assembled on the bottom cover (400) and between the top cover (200) and bottom cover (400); and the cartridge ejecting member (300) rotates between initial position and open position under the action of the top cover (200); the coffee cartridge is unloaded and falls into the cavity (120) automatically when the cartridge ejecting unit (300) is in the open position In the present embodiment, the cartridge ejecting member (300) comprises a loading seat (310) and two sliding rods (320), one ends of the two sliding rods are respectively rotationally connected to the bottom cover (400) and the ends correspond to the cavity (120), the other ends of two sliding rods (320) are respectively fixedly connected to the loading seat (310), which correspond to and stretch to the infusion chamber (110). The cartridge ejecting member (300) abut against the casing (450) and the loading seat (310) stretches into the infusion chamber (110) when the cartridge ejecting member (300) rotates to the initial position.

In the present embodiment, the cartridge ejecting member (300) comprises two limit components (340) which can make the cartridge ejecting member's (300) open angle smaller than the top cover's (200) largest open angle; two limit holes are arranged on the bottom cover (400) to match the limit components (340); two flanges (350) are arranged on the cartridge ejecting member (300), the two hook mechanisms (210) can respectively clamp the two flanges (350). In the present embodiment, two cylinders (330) are arranged on the cartridge ejecting member (300) to match the two axle holes, the two limit components (340) are fixedly arranged on the two cylinders (330).

A return unit is used to reset the bottom cover (400), which is assembled between the bottom cover (400) and the housing (100). In the present embodiment, the return unit includes two first elastic components (600), one end of every first elastic component (600) is respectively fixedly connected to the two outsides of the housing (100), the two bumps (420) respectively stretch into the two grooves (140) and fixedly connect to the other end of the first elastic (600) component.

When the coffee cartridge's extraction finishes, only need to unfold the handle (240), separate the two clasps and location pins (430), the cartridge ejecting member (300) still lies in the initial position at this moment, while, give an external force to the top cover (200), the top cover (200) automatically opens with a certain angle under the action of the second elastic component (230). During the top cover (200) opening, the cartridge ejecting member (300) rotates with the rotation of the top cover (200) under the action of hook (210), the bottom cover (400) move forward under the action of pushrod (500), continually to open the top cover (200) until the cartridge ejecting unit is in the open position, then the waste coffee cartridge slides down and drops into cavity (120) along the two sliding rods. Continually to open the top cover (200), the top cover (200) keep actuating the cartridge ejecting member (300) to rotate with the action of the second elastic component (230). When the cartridge ejecting member (300) rotates to the stopping point with the action of the limit component (340), the stopping point is where the limit component (340) stop rotating in the limit holes, the cartridge ejecting member (300) separates the hook (210) and returns to the bottom cover (400) automatically. When the bump (420) on the bottom cover (400) moves to the very front of the groove (140) (the very front of the groove (140) can stop the movement of the bump (420)), the top cover (200) reaches to the largest angle, at this moment, a new coffee cartridge can be loaded on the loading seat (310) of cartridge ejecting member (300), then closes the top cover (200), at the same time, the bottom cover returns back to the housing (100) under the action of the return unit, then folds the handle (240), the two clasps (250) are fastened to two location pins (430), the top cover (200) fastens the bottom cover (400).

Of course, the invention is not limited to the examples which have just been described and many adjustments may be made to these examples without departing from the scope of the invention, notably as regards the number, the type and the position of the connectors, the way of laying out the interface with the user. The standards and norms which are cited in this document as an example are by no means limiting, their equivalents as well as their successors enter the scope of the invention.

What is claimed is:

1. An automatic cartridge ejecting unit for a coffee machine, comprising:
    a housing;
    a top cover rotationally assembled on the housing;
    a bottom cover having
        an infusion chamber used to load a coffee cartridge and extract the coffee from the coffee cartridge, and
        a cavity used to contain the coffee cartridge after the coffee cartridge is used, said bottom cover being slidably assembled on the housing and in transmission connection with the top cover, said top cover being arranged over the bottom cover;
    a cartridge ejecting member used to hold the coffee cartridge, the cartridge ejecting member rotationally assembled on the bottom cover and lying between the top cover and the bottom cover, the cartridge ejecting member being rotated by the top cover so as to be movable between an initial position and an open position, when the cartridge ejecting member is in the open position, the coffee cartridge is unloaded and falls into the cavity; and
    a return unit used to reset the bottom cover, the return unit being assembled between the bottom cover and the housing.

2. An automatic cartridge ejecting unit for a coffee machine according to claim 1, further comprising two pushrods respectively pivoted to two sides of the top cover in one ends of the pushrods, and to two sides of the bottom cover in another ends of the pushrods.

3. An automatic cartridge ejecting unit for a coffee machine according to claim 1, wherein the return unit comprises:
    two first elastic components;
    two grooves that extend through the housing and are respectively arranged on two sides of the housing;
    two bumps respectively arranged in two outer parts of the bottom cover;
    wherein one end of every first elastic component is respectively fixedly connected to the two sides of the housing, the two bumps respectively stretch into the two grooves and fixedly connect to another end of each of the first elastic components.

4. An automatic cartridge ejecting unit for a coffee machine according to claim 3, wherein
    the housing includes plural rails arranged at an inner bottom of the housing; and
    the bottom cover includes plural sliders arranged at an exterior bottom of the bottom cover to match the rails.

5. An automatic cartridge ejecting unit for a coffee machine according to claim 1, wherein the cartridge ejecting unit further comprises:
    a loading seat corresponding to and stretching to the infusion chamber; and
    two sliding rods having ends that are respectively rotationally connected to the bottom cover, the ends corresponding to the cavity, another ends of the two sliding rods are respectively fixedly connected to the loading seat.

6. An automatic cartridge ejecting unit for a coffee machine according to claim 5, wherein the cartridge ejecting member includes two limit components which can make the cartridge ejecting member's open angle smaller than the top cover's largest open angle; and
    wherein two limit holes are arranged on the bottom cover to match the limit components.

7. An automatic cartridge ejecting unit for a coffee machine according to claim 6, wherein
    the top cover includes two hook mechanisms;
    the automatic cartridge ejecting unit includes two flanges arranged on the cartridge ejecting member; and
    the two hook mechanisms can respectively clamp the two flanges.

8. An automatic cartridge ejecting unit for a coffee machine according to claim 6, wherein
    the automatic cartridge ejecting unit includes two cylinders arranged on the cartridge ejecting member;
    the bottom cover includes two axle holes to match the two cylinders; and
    the two limit components are fixedly arranged on the two cylinders.

9. An automatic cartridge ejecting unit for a coffee machine according to claim 1, further comprising:
    a first spindle, the top cover being rotationally assembled on the housing by the first spindle; and
    two second elastic components making the top cover opened by a certain angle, the second elastic components are assembled on the first spindle, whose one end is against the top cover, and another end is against the housing.

10. An automatic cartridge ejecting unit for a coffee machine according to claim 9, wherein
    the second elastic components are a torsional spring;
    the top cover includes a handle flexibly assembled to the top cover, and two clasps that are in transmission connection with the handle; and the bottom cover includes two location pins to match the two clasps.

\* \* \* \* \*